United States Patent [19]

Inoue et al.

[11] Patent Number: 4,993,835
[45] Date of Patent: Feb. 19, 1991

[54] APPARATUS FOR DETECTING THREE-DIMENSIONAL CONFIGURATION OF OBJECT EMPLOYING OPTICAL CUTTING METHOD

[75] Inventors: Yasuo Inoue; Tadashi Nishimura, both of Itami, Japan

[73] Assignee: Mitsubishi Denki Kabushiki Kaisha, Japan

[21] Appl. No.: 424,979

[22] Filed: Oct. 23, 1989

[30] Foreign Application Priority Data

Jun. 16, 1989 [JP] Japan .................................. 1-152187

[51] Int. Cl.$^5$ ...................... G01B 11/24; G01N 21/86
[52] U.S. Cl. ...................................... 356/376; 250/560
[58] Field of Search ............................... 356/375–377, 356/380, 386, 387; 250/560, 561

[56] References Cited

U.S. PATENT DOCUMENTS

4,794,262 12/1988 Sato et al. ........................... 250/560

Primary Examiner—Edward P. Westin
Assistant Examiner—Hoa Pham
Attorney, Agent, or Firm—Leydig, Voit & Mayer

[57] ABSTRACT

Disclosed is an apparatus for detecting the three-dimensional configuration of an object employing an optical cutting method. A light projector pulse-flashes slit-shaped light and causes the light to scan an object at a predetermined speed. An image sensor having a plurality of pixels is disposed in opposition to the object. An optical system forms on the image sensor an image of an optical cutting line formed on the surface of the object by the light. A difference detector detects the difference between the on- and off- levels of each of pulses of the image detected by the pixels of the sensor. A time calculator calculates the time at which the image has passed each of the pixels, on the basis of the difference detected by the difference detector. A configuration calculator calculates the three-dimensional configuration of the object on the basis of the calculated passage time and the scanning speed of the slit-shaped light. Since the difference between the levels of each pulse of the image is obtained, any optical signals resulting from a factor other than the pertinent pulses, such as influence by the background of the object, or a flash can be excluded, and the configuration can be detected with a high level of precision.

6 Claims, 5 Drawing Sheets

APPARATUS FOR DETECTING THREE-DIMENSIONAL CONFIGURATION OF OBJECT EMPLOYING OPTICAL CUTTING METHOD

CROSS REFERENCE TO RELATED APPLICATION

This application is related to a copending U.S. pat. application no. 07/424,924 by Yasuo Inoue and Yasuo Yamaguchi, filed on the same day as the present application, having a title of "APPARATUS FOR DETECTING THREE-DIMENSIONAL CONFIGURATION OF OBJECT EMPLOYING OPTICAL CUTTING METHOD".

BACKGROUND OF THE INVENTION

1. Field of the Invention

The present invention relates to an apparatus for detecting the three-dimensional configuration of an object employing an optical cutting method.

2. Description of the Related Art

Figure 5:
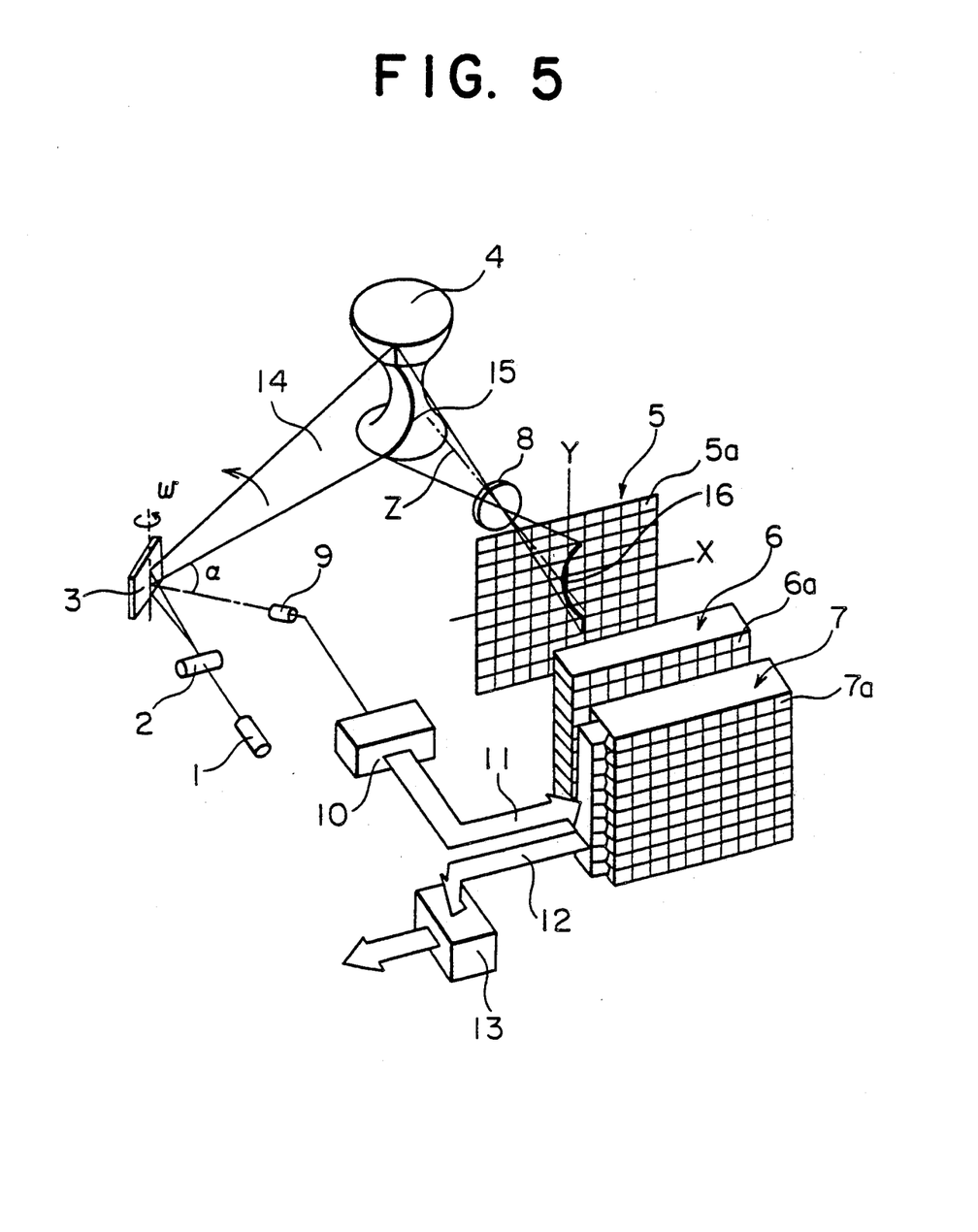
FIG. 5 is a perspective view showing a conventional three-dimensional configuration detecting apparatus.

FIG. 5 schematically shows a conventional apparatus for measuring the three-dimensional configuration of an object by an optical cutting method. The apparatus includes a laser source 1 and a rotary mirror 3 disposed ahead of the laser source 1, with a cylindrical lens 2 disposed therebetween. An object 4 to be measured is placed ahead of the rotary mirror 3. An image sensor 5 is disposed in opposition to the object 4. A determination section 6 is connected to the image sensor 5, and a memory section 7 is connected to the determination section 6. The apparatus further includes an optical lens 8 for forming an image of the object 4 on the image sensor 5, which is disposed between the object 4 and the image sensor 5.

An optical detector 9 is disposed in the vicinity of the rotary mirror 3 in order to detect a reference angle of the rotary mirror 8. A counter 10 is connected to the optical detector 9, and the output of the counter 10 is connected to the memory section 7 via a data bus 11. A data processor 13 is connected to the memory section 7 via a data bus 12.

The image sensor 5 has a plurality of pixels 5a which are arranged on an X-Y plane when the axis connecting the image sensor 5 and the object 4 is assumed to be a Z axis. The determination section 6 and the memory section 7 have a plurality of comparators 6a and a plurality of memories 7a, respectively, which are arranged in one-to-one correspondence with each of the pixels 5a of the image sensor 5.

The conventional apparatus having the above-described construction operates in the following manner. A laser beam is radiated from the laser source 1 and, simultaneously, the rotary mirror 3 is rotated about the Y axis at an angular velocity $\omega$. The laser beam radiated from the laser source 1 is diverged in the direction of the Y axis by the cylindrical lens 2, and it is then reflected by the rotary mirror 3, whereupon it forms a slit-shaped beam 14. The beam 14 rotates at the angular velocity $\omega$ as the rotary mirror 3 rotates. When the beam 14 passes through the optical detector 9, a detection signal is output from the optical detector 9 to the counter 10. Upon receiving this signal, the counter 10 starts to measure time. Thereafter, time data indicative of the time t reached every moment is momently output from the counter 10 to the memory section 7 via the data bus 11.

When the rotary mirror 3 further rotates and the slit-shaped beam 14 irradiates the object 4, the beam 14 scans the surface of the object 4 as the beam simultaneously forms an optical cutting line 15 on the surface of the object 4. At this time, an image 16 of the optical cutting line 15 is projected onto the image sensor 5 through the optical lens 8. Each comparator 6a of the determination section 6 makes a determination on the basis of an output signal from the corresponding pixel 5a of the image sensor 5 as to the passage of the image 16 of the optical cutting line 15 through the corresponding pixel 5a. When each comparator 6a determines that the image 16 of the optical cutting line 15 has passed the corresponding pixel 5a, the comparator 6a outputs a trigger signal to the associated memory 7a of the memory section 7, whereby the time data that is on the data bus 11 at this time is stored in the memory 7a.

When items of data which are each indicative of the time t reached at the time of the passage of the image 16 of the optical cutting line 15 through each of the pixels 5a have been stored into the corresponding memories 7a in this way, these items of data, each indicative of the passage time, are read by the data processor 13 via the data bus 12. Because the angle $\alpha$ by which the slit-shaped beam 14 deviates from the reference angle at a time t reached is expressed by: $\alpha = \omega t$, it is possible to express the beam 14 in the form of a plane equation in which the time t reached is used. Furthermore, a point on the image 16 projected on the image sensor 5 corresponds to one point on the surface of the object 4, and these points are positioned on the same line passing through the center of the optical lens 8. Therefore, from the equation expressing this line and a plane equation expressing the beam 14, the spatial coordinates of a certain point on the object 4 which corresponds to one point of the image 16 being projected on the image sensor 5 are calculated. The configuration and the position of the object 4 are calculated by the data processor 13 employing the above-described method.

However, the following problem is encountered in the event that any noise or flash which involves a sudden change in the degree of brightness and darkness enters one or more pixels 5a, or in the case where the background of the object 4 is extremely bright. In such cases, each pixel 5a detects the image 16 of the optical cutting line 15 with a reduced S/N ratio, thereby leading to a reduction in the level of precision with which the three-dimensional configuration of the object 4 is measured.

SUMMARY OF THE INVENTION

The present invention has been made to overcome the above-described problem. It is an object of the present invention to provide an apparatus for detecting the three-dimensional configuration of an object employing an optical cutting method that is capable of detecting the three-dimensional configuration of the object at a high level of precision regardless of any sudden change in the degree of brightness and darkness or of the degree of brightness of the background.

An apparatus for detecting the three-dimensional configuration of an object employing an optical cutting method in accordance with the present invention comprises: light projecting means for pulse-flashing slit-shaped light and for causing the light to scan the object at a predetermined speed; an image sensor disposed in opposition to the object and having a plurality of pixels; an optical system for forming on the image sensor an image of an optical cutting line formed on the surface of the object by the slit-shaped light; difference detecting means which detects the difference between the on- and off- levels of each of pulses of the image of the optical cutting line that has been detected by the pixels of the image sensor; time calculating means for calculating the time at which the image of the optical cutting line has passed each of the pixels of the image sensor, on the basis of the difference between the levels of each of the pulses of the image of the optical cutting line that has been detected by the difference detecting means with respect to each of the pixels; and configuration calculating means for calculating the three-dimensional configuration of the object on the basis of the time of passage of the image of the optical cutting line through each of the pixels, the time having been calculated by the time calculating means, and on the basis of the scanning speed of the slit-shaped light.

DESCRIPTION OF THE PREFERRED EMBODIMENTS

Embodiments of the present invention will be described hereunder with reference to the accompanying drawings.

Figure 1:
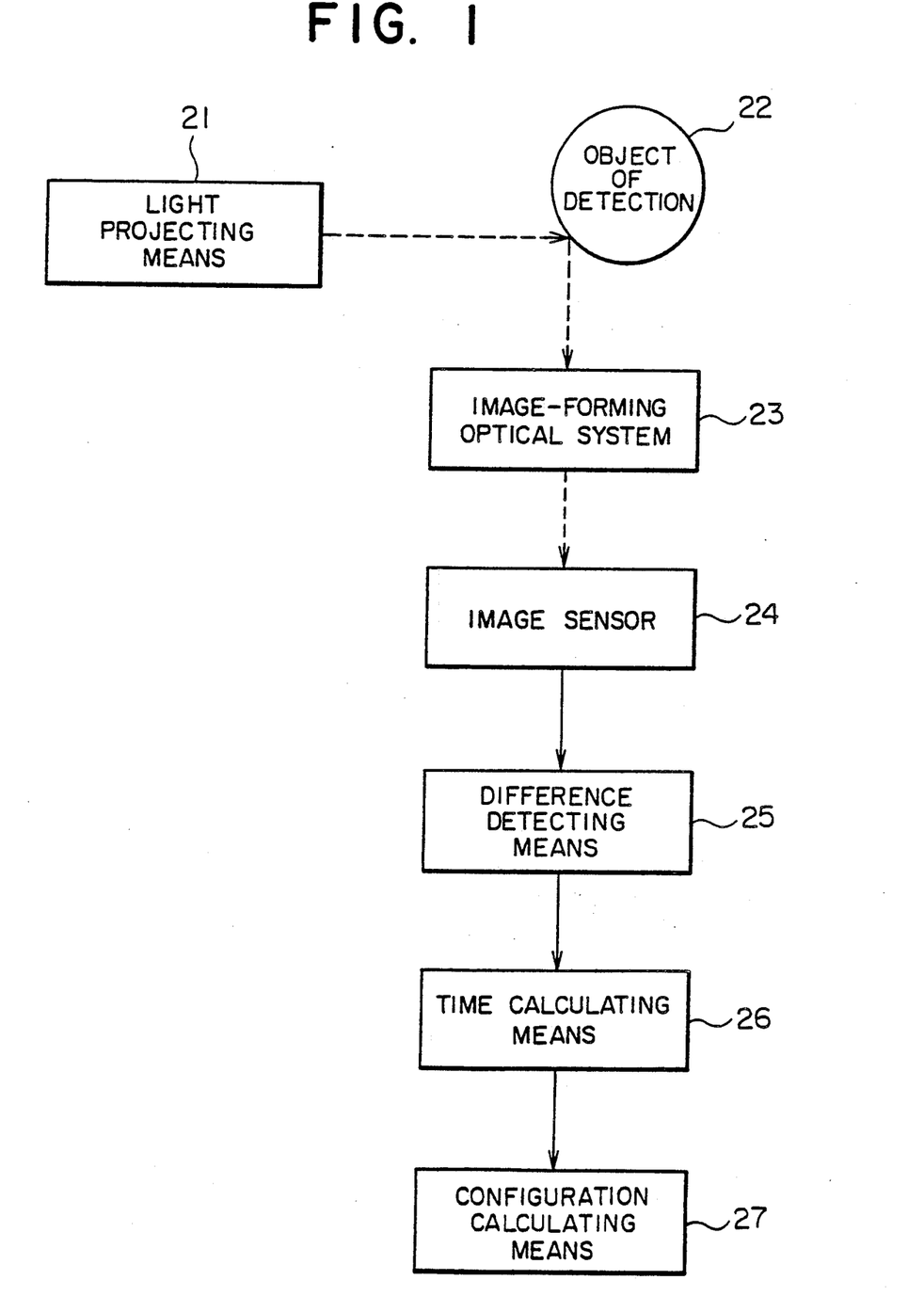
FIG. 1 is a block diagram showing an apparatus for detecting the three-dimensional configuration of an object employing an optical cutting method, in accordance with one embodiment of the present invention.

Referring to FIG. 1, a light projecting means 21 is provided for pulse-flashing slit-shaped light, for causing the light to irradiate an object 22 of detection, and for causing the irradiating light to scan the surface of the object 22. Specifically, the light projecting means 21 comprises members corresponding to the laser source 1, the cylindrical lens 2, and the rotary mirror 3, which constitute the conventional apparatus shown in FIG. 5, and also comprises a control circuit (not shown) for causing the laser source 1 to pulse-oscillate.

An image sensor 24 is disposed in such a manner as to oppose the object 22, with an image-forming optical system 23 disposed therebetween. The image-forming optical system 23 includes an optical lens and is operable to form, on the image sensor 24, an image of an optical cutting line formed on the surface of the object 22 of detection by the slit-shaped light. The image sensor 24 has a plurality of pixels arranged two-dimensionally on an X-Y plane normal to a Z axis connecting the image sensor 24 and the object 22, this construction being similar to that of the image sensor 5 shown in FIG. 5. The image sensor 24 detects an image of the optical cutting line as the image is being formed thereon by the image-forming optical system 23.

A difference detecting means 25 is connected to the image sensor 24, and is operable to detect the difference between the on- and off- levels of each of pulses of the image of the optical cutting line that has been detected by the pixels of the image sensor 24.

A time calculating means 26 is connected to the difference detecting means 25, and is operable to calculate, on the basis of a signal indicative of the difference detected by the difference detecting means 25, the time at which the image of the optical cutting line has passed each of the pixels of the image sensor 24. Furthermore, a configuration calculating means 27 is connected to the time calculating means 26, and is operable to calculate the three-dimensional configuration of the object 22 using the time of passage of the optical cutting line through each of the pixels, the passage time having been calculated by the time calculating means 26.

Next, operation will be described.

First, the light projecting means 21 operates in such a manner that slit-shaped light is pulse-flashed at a predetermined frequency as the light is simultaneously rotated at a predetermined angular velocity $\omega$, and the light is caused to scan the surface of the object 22 of detection. The slit-shaped light forms an optical cutting line on the surface of the object 22, and an image of the optical cutting light is formed on the image sensor 24 by the image-forming optical system 23. At this time, since the light is pulse-flashed, the image of the optical cutting line being formed on the image sensor 24 also undergoes pulsed flashing. As a result, when an image of the optical cutting line is detected by each of the pixels of the image sensor 24, a pulse-shaped detection signal is output from each of the pixels. At this time, however, since the image of the optical cutting line being formed on the image sensor 24 simultaneously moves as the scanning light moves, a pulse-shaped detection signal is output from each of the pixels only during the period in which the image of the optical cutting line is passing the pixel.

A pulse-shaped detection signal output from each of the pixels of the image sensor 24 is supplied to the difference detecting means 25 where the difference is obtained as between the on-level and the off-level of each of pulses of the detection signal. A signal indicative of the thus obtained difference is sent to the time calculating means 26. Since the difference is obtained at this time as between the on- and off- levels of pulses of the image of the optical cutting line, it is possible to exclude any optical signals resulting from a factor other than the pertinent pulses, such as influence by the background of the object, or a flash. Thus, it is possible to obtain a difference signal with a high S/N ratio.

The time calculating means 26 calculates, on the basis of the difference signal sent from the difference detecting means 25, the time at which the image of the optical cutting line has passed each of the pixels.

In this way, when the scanning of the object 22 by the slit-shaped light has been completed, and the time of passage of the image of the optical cutting line through each of the pixels has been calculated, the configuration calculating means 27 calculates, from a plane equation expressing the slit-shaped light and from an equation expressing the line connecting each of the pixels and the center of the image-forming optical system 23, the spatial coordinates of each of various points on the surface of the object 22, thereby detecting the configuration of the object 22. The configuration calculating means 27 comprises a computer such as a microprocessor.

As described above, according to this embodiment, because the time at which the image of the optical cutting line passes through each of the pixels of the image sensor 24 is calculated on the basis of a signal indicative of the difference between the on- and off- levels of each of pulses of the image detected by each of the pixels, it is possible to exclude any optical signal resulting from a factor other than the pertinent pulses, such as influence by the background of the object, or a flash. Thus, the configuration of the object is detected with a high level of precision.

Figure 2:
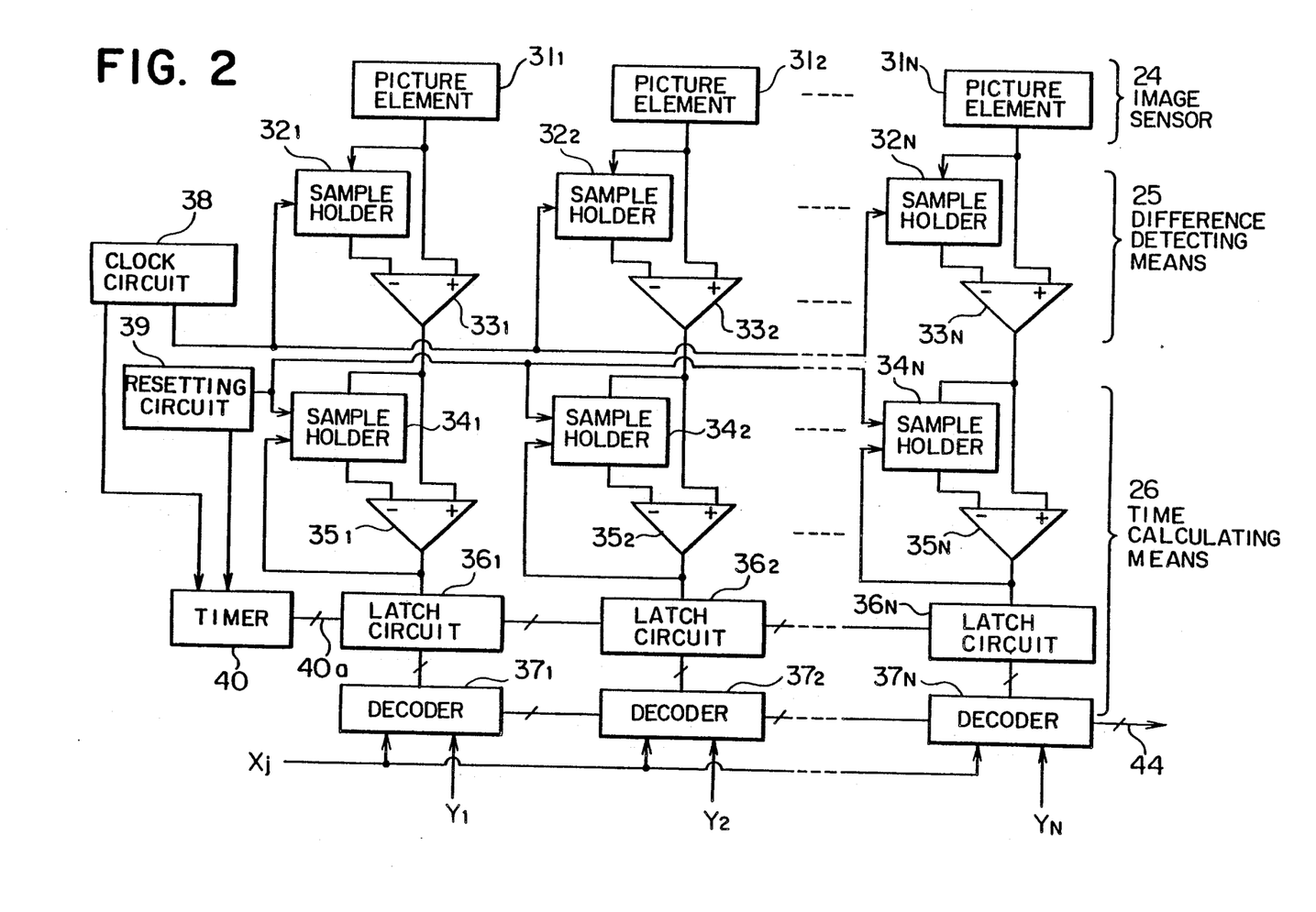
FIG. 2 is a circuit diagram showing a specific example of essential parts of the apparatus shown in FIG. 1.

FIG. 2 shows a specific example of the arrangement of a circuit including the image sensor 24, the difference detecting means 25, and the time calculating means 26. The image sensor 24 has N pixels 311 to 31N which each comprises, e.g., a photo-sensor and which form one pixel row extending in the direction of the X axis. Each of the pixels 311 to 31N is connected to each of first sample holders 321 to 32N and also to each of the respective first input terminals of first difference amplifiers 331 to 33N. The first difference amplifiers 331 to 33N have their respective second input terminals connected to the output terminals of the associated first sample holders 321 to 32N. The respective output terminals of the first difference amplifiers 331 to 33N are each connected to second sample holders 341 to 34N and also to the respective first input terminals of second difference amplifiers 351 to 35N. The second difference amplifiers 351 to 35N have their respective second input terminals connected to the output terminals of the associated second sample holders 341 to 34N. The respective output terminals of the second difference amplifiers 351 to 35N are each connected, as a trigger input, to the second sample holders 341 to 34N as well as to latch circuits 361 to 36N. The latch circuits 361 to 36N are each connected to decoders 371 to 37N.

Furthermore, the first sample holders 321 to 32N are commonly connected to a clock circuit 38 so as to be supplied with a trigger input therefrom. The second sample holders 341 to 34N are commonly connected to a resetting circuit 39 for resetting data held in these sample holders 341 to 34N. Each of the latch circuits 361 to 36N is connected to a timer 40 via a data bus 40a. The clock circuit 38 and the resetting circuit 39 are connected to the timer 40.

The first sample holders 321 to 32N, the first difference amplifiers 331 to 33N, and the clock circuit 38 form the difference detecting means 25. The second sample holders 341 to 34N, the second difference amplifiers 351 to 35N, the latch circuits 361 to 36N, the decoders 371 to 37N, the resetting circuit 39, and the timer 40 form the time calculating means 26. FIG. 2 illustrates a circuit solely corresponding to one pixel row extending in the X axis direction, for instance, to a jth row of pixels. In practice, a plurality of circuits having the same arrangement are arranged in the Y axis direction. However, each of the clock circuit 38, the resetting circuit 39, and the timer 40 is provided commonly with respect to all the two-dimensionally arranged pixels.

Figure 3:
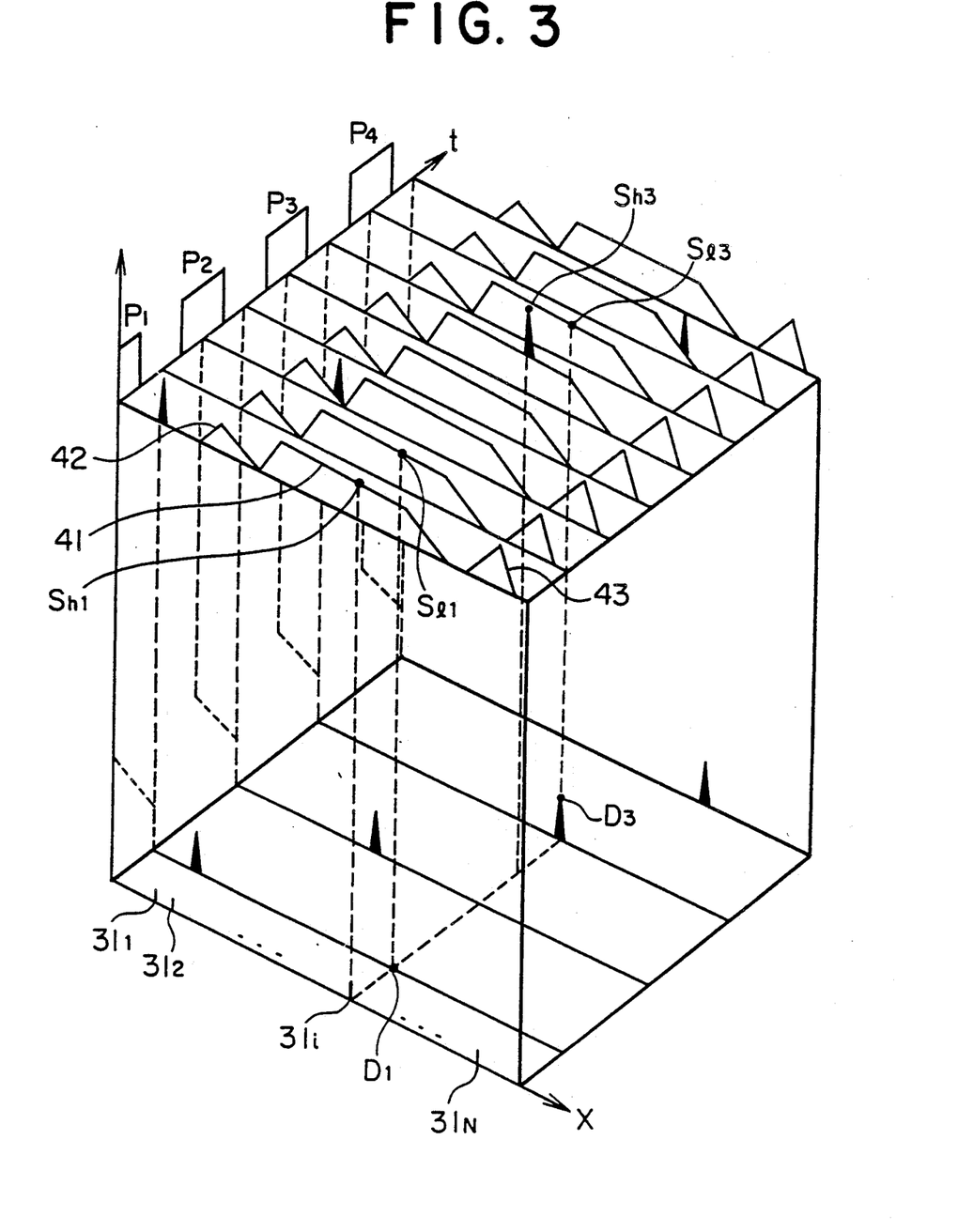
FIG. 3 is a timing chart showing the operation of the specific example shown in FIG. 2.

Next, the operation of this specific example will be described with reference to the timing chart shown in FIG. 3.

At the start of scanning by slit-shaped light, the resetting circuit 39 outputs a resetting signal to both the second sample holders 341 to 34N and the timer 40, whereby the value held by each of the sample holders 341 to 34N is reset to its initial value 0, and the timer 40 simultaneously starts to measure time. The slit-shaped light pulse-flashes in such a manner as to be turned on and off in accordance with the high- and low-levels of a clock signal output by the clock circuit 38. The light forms an optical cutting line on the surface of the object 22 of detection, and an image of the optical cutting line is formed on the image sensor 24. It is assumed here that, as the light scans the surface of the object 22, the image of the optical cutting line moves on the image sensor 24 and in the direction of the X axis from the pixel 311 to the pixel 31N.

When the periphery of the object 22 of detection is bright, in spite of the fact that the light is projected by the light projecting means 21, an image of the object 22 itself is always formed on the image sensor 24 by the image-forming optical system 23, and is then detected by the pixels 311 to 31N. In FIG. 3, waves 41 represent images of the object 22 itself which are detected by those plurality of pixels which are, among all the plurality of pixels 311 to 31N arranged in the X axis direction, disposed in the vicinity of the center in this direction. Waves 42 and waves 43 represent images of the periphery of the object 22 which are formed due, for instance, to the influence of the background of the object 22 or to a sudden change in brightness and darkness.

When the signal output from the clock circuit 38 goes high, detection signals from the respective pixels 311 to 31N are each held by the first sample holders 321 to 32N. Subsequently, when the clock signal goes low, the detection signals held by the first sample holders 321 to 32N are output to the first difference amplifiers 331 to 33N, in which the detection signals are then compared with another group of detection signals which have been directly input in real time to the first difference amplifiers 331 to 33N from the pixels 311 to 31N. Signals indicative of the differences between these two groups of detection signals are output from the first difference amplifiers 331 to 33N.

Accordingly, the following operation is provided by, for instance, a pixel 31i (FIG. 3) and the associated first difference amplifier 33i (FIG. 2). During one period from a clock pulse P1 to a subsequent clock pulse P2, if no slit-shaped light is detected by the pixel 31i and there is no change in the surface of the object 22, a detection signal Sh1 output by the pixel 31i while the clock signal is high and a subsequent detection signal Sl1 output by the same while the clock signal is low are at the same level. In such cases, the first difference amplifier outputs a difference signal D1 at the 0-level. Thereafter, when the image of the optical cutting line moves to be positioned on the pixel 31i at the time point of a clock pulse P3, the pixel 31i detects an image of the optical cutting line together with an image of the object 22 and outputs a high-level detection signal Sh3 while the clock pulse P3 is high. When the clock pulse P3 goes low, however, the pixel 31i does not detect any image of the optical cutting line because the light, which is irradiating the object 22, flashes on and off in accordance with the high-and low- levels of the clock signal, and, accordingly, the light is turned off while the clock pulse P3 is low. At this time, therefore, the pixel 31i outputs a detecting signal Sl3 whose level corresponds solely to an image of the object 22. Consequently, the level of the detection signal indicative of an image of the object 22 is offset by the operation of the first difference amplifier, so that a difference signal D3 at a level solely corresponding to an image of the optical cutting line is output by the first difference amplifier.

Irrelevant waves such as the waves 42 and 43 detected by the image sensor 24 as a result of a factor such as the influence of the background of the object 22, or a sudden change in darkness and brightness are also offset in a similar manner as in the case of waves resulting from the detection of the image of the object 22. In this way, the first difference amplifier outputs difference signals relevant to the image of the optical cutting line without being perplexed by such irrelevant waves.

In this manner, as the image of the optical cutting line moves in the X axis direction, difference signals indicative of the passage of the image of the optical cutting line are sequentially output from the first difference amplifiers 331 to 33N to the second difference amplifiers 351 to 35N.

A difference signal is output from the first difference amplifier to the associated second difference amplifier where the signal has its level compared with the signal level held in the associated second sample holder. If the level of the difference signal is greater than the level of the held signal, a high-level signal is output from the second difference amplifier to the second sample holder and also to the associated latch circuit. The supply of this high-level signal causes another difference signal output from the first difference amplifier to be newly held in the second sample holder, and also causes the time reached at this time to be fetched from the timer 40 via the data bus 40a to the latch circuit and held therein. On the other hand, if the level of the difference signal output from the first difference amplifier is below the level of the signal held by the second sample holder, no signal is output from the second difference amplifier.

Thus, the second sample holder and the second difference amplifier constitute a peak detecting circuit for detecting the peak in the difference signals output from the first difference amplifier. The time at which a peak is reached by difference signals is held by the latch circuit.

The above-described actions continue until scanning by the slit-shaped light is completed, so that the times at which the image of the optical cutting line has passed the pixels 311 to 31N are held by the corresponding latch circuits 361 to 36N.

Thereafter, the passage time held by each of the latch circuits 361 to 36N is transmitted to the configuration calculating means 27 via each of the decoders 371 to 37N. At this time, the decoders 371 to 37N are sequentially designated by means of an address line Xj indicating that these decoders 371 to 37N correspond to the jth pixel row and by means of address lines Y1 to YN each pertaining to the Y direction, and the passage times are each transmitted via a data bus 44.

By virtue of the above-described arrangement, since it is possible to exclude any optical signals resulting from a factor other than the light, such as influence by the background of the object, or a flash, the detection of the three-dimensional configuration of the object can be effected with a high level of precision. Furthermore, even when the background of the object is moving, if the period of the clock signal is set to a value which is adequately small relative to the speed of movement, it is possible to avoid the influence of the background.

The circuit shown in FIG. 2 operates in such a manner that a determination as to the peak in the difference signals output from the first difference amplifier 33i is made in every one period of the clock signal. Alternatively, the peak may be detected by obtaining an average of difference signals in every several periods of the clock signal. With this arrangement, even when an optical signal resulting from, e.g., a flash, is generated in synchronization with the pulse-flashing of the light, it is possible to eliminate the influence of the flash or the like. In order to obtain an average in every several periods of the clock signal, however, it is desired that the period of the clock signal be adequately small with respect to the scanning speed of the light.

It is also possible to adopt an arrangement where the image sensor 24, the difference detecting means 25, and the time calculating means 26 are formed into a laminated structure. In this case, the time calculating means 26 itself may have a laminated structure which is divided into a plurality of groups formed by a peak detecting circuit including the second sample holders 341 to 34N and the second difference amplifiers 351 to 35N, the latch circuits 361 to 36N, and the decoders 371 to 37N.

Figure 4:
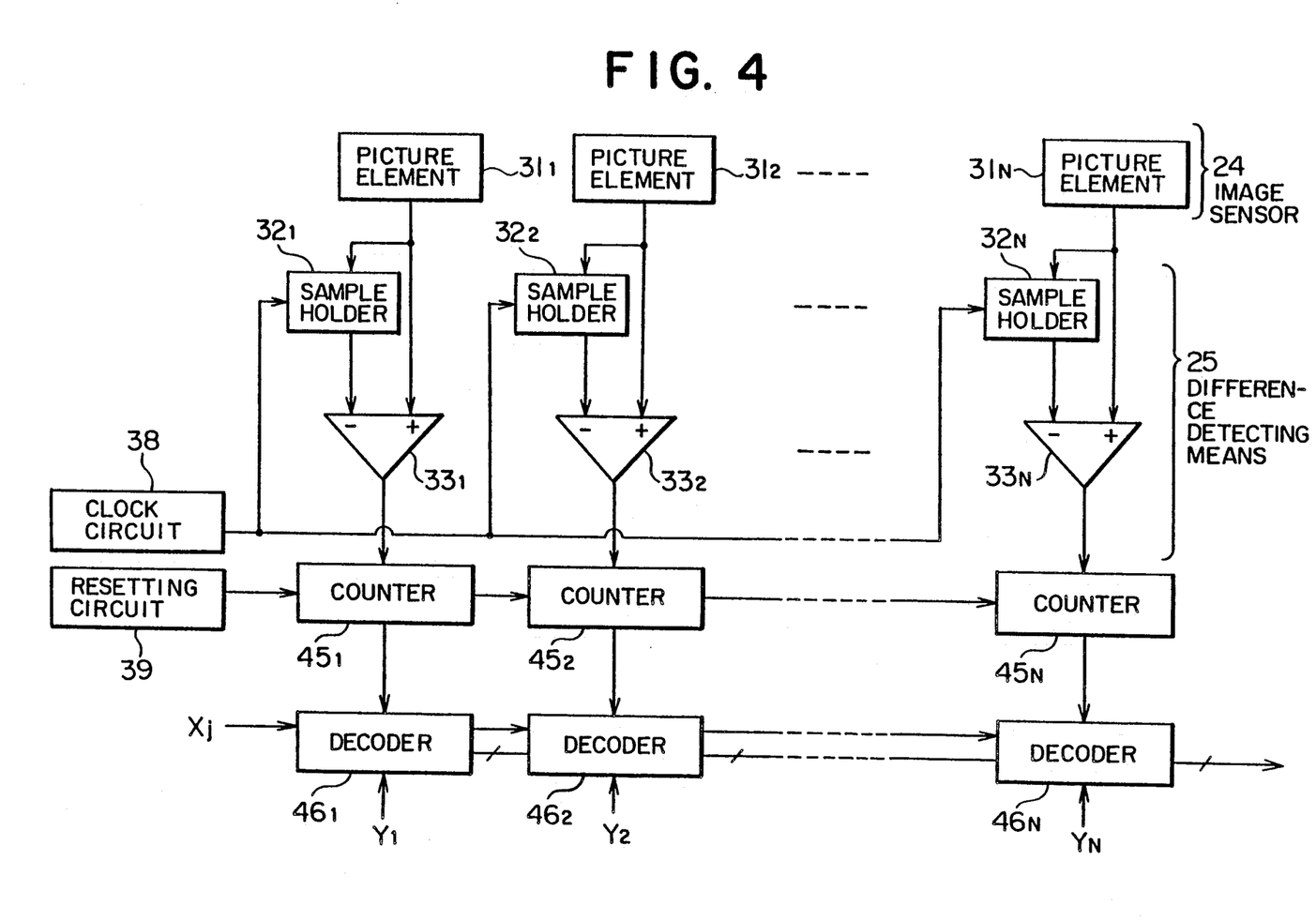
FIG. 4 is a circuit diagram showing another specific example of essential parts of the apparatus shown in FIG. 1.

With the specific example shown in FIG. 2, the time at which the image of the optical cutting line has passed each of the pixels 311 to 31N is calculated by detecting the peak of the difference signals output from each of the first difference amplifiers 331 to 33N. However, the passage time may be alternatively calculated by counting the number of pulses of the image of the optical cutting line detected by each of the pixels 311 to 31N. FIG. 4 shows a circuit arrangement which may be adopted in this case. The circuit is distinguished in that counters 451 to 45N are each connected to the respective output terminals of the first difference amplifiers 331 to 33N of the difference detecting means 25, and decoders 461 to 46N are each connected to the counters 451 to 45N.

The first difference amplifier 33i outputs a pulse-shaped difference signal in synchronization with the on/off- flashing of the image of the optical cutting line only during the period in which the image of the optical cutting line is positioned on the corresponding pixel 31i. The counter 45i counts the number of pulses of this difference signal. Accordingly, if the numbers counted by pertinent ones of the counters 451 to 45N are summed up, it is possible to calculate the time at which the image of the optical cutting line has passed each of the pixels 311 to 31N. The counted numbers of the counters 451 to 45N are each transmitted to a computer, not shown, via the associated decoders 461 to 46N, and the computer calculates the passage time.

With the specific example shown in FIG. 4, there is no need to provide a data bus corresponding to the data bus 40a used in the circuit shown in FIG. 2 to allow time data to be input from the timer 40 to the latch circuits 361 to 36N corresponding to the pixels 311 to 31N. In general, in order to transmit practically usable time data, it is necessary to use, as the data bus 40a, a 16-bit data bus or a data bus of a similar capacity. Therefore, if the data bus 40a is unnecessary, it is possible to simplify the wiring arrangement of the entire circuit.

What is claimed is:

1. An apparatus for detecting the three-dimensional configuration of an object employing an optical cutting method comprising:

light projecting means for pulse-flashing slit-shaped light and for causing said light to scan said object at a predetermined speed;

an image sensor disposed in opposition to said object and having a plurality of pixels;

an optical system for forming on said image sensor an image of an optical cutting line formed on the surface of said object by said slit-shaped light;

difference detecting means which detects the difference between on- and off- levels of each pulse of the image of the optical cutting line that has been detected by said pixels of said image sensor;

time calculating means for calculating the time at which the image of the optical cutting line has passed each of said pixels of said image sensor, on the basis of the difference between the levels of each of said pulses of the image of the optical cutting line that has been detected by said difference detecting means with respect to each of said pixels; and configuration calculating means for calculating the three-dimensional configuration of said object on the basis of the time of passage of the image of the optical cutting line through each of said pixels, said time having been calculated by said time calculating means, and on the basis of the scanning speed of said slit-shaped light.

2. An apparatus according to claim 1, wherein said configuration calculating means comprises a computer.

3. An apparatus according to claim 1, wherein said light projecting means comprises laser oscillating means for oscillating a laser beam, a cylindrical lens for diverging in one direction the laser beam oscillated by said laser oscillating means, and a rotary mirror for causing scanning by the laser beam diverged by said cylindrical lens.

4. An apparatus according to claim 1, wherein said difference detecting means comprises a plurality of first sample holders and a plurality of first difference amplifiers;

wherein each first sample holder is connected both to a corresponding pixel of said image sensor and to a first difference amplifier, whereby each of said first sample holders holds the level of a detection signal of the corresponding pixel of said image sensor; and wherein an output from each of said first difference amplifiers represents the difference between the level of a detection signal of the corresponding pixel of the image sensor and the level of a signal held in the first sample holder.

5. An apparatus according to claim 4, wherein said time calculating means comprises a plurality of counters which are each connected to each of said first difference amplifiers of said difference detecting means and which each count the number of pulses of an output signal of the associated first difference amplifier, and data processing means for calculating the time at which the image of the optical cutting line has passed each of said pixels of said image sensor on the basis of the numbers of pulses calculated by said plurality of counters.

6. An apparatus according to claim 4, wherein said time calculating means comprises:

a timer for measuring time;

a plurality of peak detecting circuits comprising a plurality of second sample holders and second difference amplifiers, each individual second sample holder and second difference amplifier together comprising individual peak detecting circuits, wherein each peak detecting circuit is connected to one of said first difference amplifiers of said difference detecting means, whereby each of said peak detecting circuits detects the peak of an output signal of said first difference amplifier;

a plurality of latch circuits wherein each of said latch circuits is connected to one of said peak detection circuits, whereby, when the associated peak detecting circuit has detected a peak, each latch circuit fetches from said timer data representing time of the detected peak and then holds the fetched data therein.

* * * * *